United States Patent
Schaefer et al.

(10) Patent No.: US 12,406,157 B2
(45) Date of Patent: Sep. 2, 2025

(54) READOUT OF OPTICALLY READABLE CODES

(71) Applicant: BAYER AKTIENGESELLSCHAFT, Leverkusen (DE)

(72) Inventors: Dirk Schaefer, Leverkusen (DE); Benjamin Hoetter, Overath (DE); Gregor Fischer, Overath (DE); Klaus Ruelberg, Overath (DE)

( * ) Notice: Subject to any disclaimer, the term of this patent is extended or adjusted under 35 U.S.C. 154(b) by 0 days.

(21) Appl. No.: 18/722,354

(22) PCT Filed: Dec. 15, 2022

(86) PCT No.: PCT/EP2022/086139
§ 371 (c)(1),
(2) Date: Jun. 20, 2024

(87) PCT Pub. No.: WO2023/117687
PCT Pub. Date: Jun. 29, 2023

(65) Prior Publication Data
US 2025/0131219 A1    Apr. 24, 2025

(30) Foreign Application Priority Data

Dec. 22, 2021  (EP) .................................... 21216812
Dec. 22, 2021  (EP) .................................... 21216923
Feb. 10, 2022  (EP) .................................... 22156217

(51) Int. Cl.
*G06K 7/14* (2006.01)
*G06V 10/774* (2022.01)
(Continued)

(52) U.S. Cl.
CPC ......... *G06K 7/1417* (2013.01); *G06K 7/1413* (2013.01); *G06K 7/1443* (2013.01);
(Continued)

(58) Field of Classification Search
CPC .. G06K 7/1417; G06K 7/1413; G06K 7/1443; G06V 10/774; G06V 10/776; G06V 30/19147; G06V 30/1916
See application file for complete search history.

(56) References Cited

U.S. PATENT DOCUMENTS 5,660,747 A     8/1997   Drouillard et al.
10,481,589 B1  11/2019   Drouillard
(Continued)

FOREIGN PATENT DOCUMENTS

DE    102005019008 A1   10/2006
EP          1737306 A2    1/2007
(Continued)

OTHER PUBLICATIONS

Cumo, Christopher, "Encyclopedia of Cultivated Plants: From Acacia to Zinnia" 2013, ISBN 9781598847758.
(Continued)

*Primary Examiner* — Matthew Mikels
(74) *Attorney, Agent, or Firm* — Michael VanEngelen

(57) ABSTRACT

The present invention relates to the technical field of the marking of articles by means of optically readable codes and of reading out the codes. The invention relates to a method,
(Continued)

Figure 1:
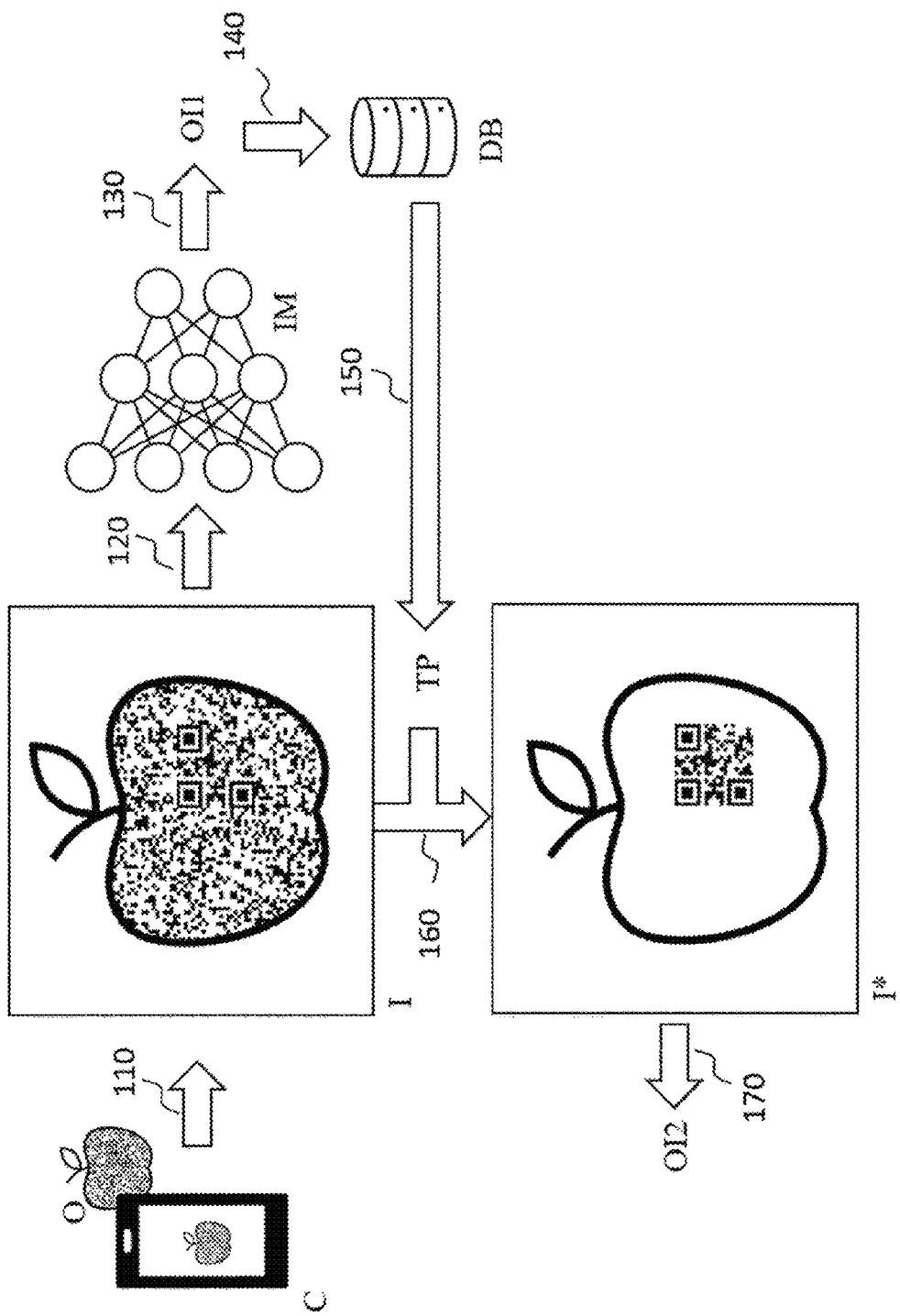

a system and a computer program product for detecting and interpreting optically readable codes that are introduced into the surfaces of articles.

14 Claims, 2 Drawing Sheets

(51) Int. Cl.
 *G06V 10/776* (2022.01)
 *G06V 30/19* (2022.01)
(52) U.S. Cl.
 CPC .......... *G06V 10/774* (2022.01); *G06V 10/776* (2022.01); *G06V 30/19147* (2022.01); *G06V 30/1916* (2022.01)

(56) References Cited

U.S. PATENT DOCUMENTS

| | | | |
|---|---|---|---|
| 2008/0124433 A1 | 5/2008 | Yelden et al. | |
| 2012/0211555 A1 | 8/2012 | Rowe | |
| 2019/0171856 A1* | 6/2019 | Sharma | ............ G06K 19/06103 |
| 2020/0175317 A1 | 6/2020 | Iwami | |
| 2021/0012076 A1 | 1/2021 | Barkan et al. | |

FOREIGN PATENT DOCUMENTS

| | | | |
|---|---|---|---|
| EP | 2281468 A1 | 2/2011 | |
| EP | 3640901 A1 | 4/2020 | |
| EP | 3896629 A1 | 10/2021 | |
| GB | 2585938 A | 1/2021 | |
| WO | WO-2007016937 A1 * | 2/2007 | ............. A23N 15/00 |
| WO | 2007130968 A2 | 11/2007 | |
| WO | 2015117438 A1 | 8/2015 | |
| WO | 2015117541 A1 | 8/2015 | |
| WO | 2016118962 A1 | 7/2016 | |
| WO | 2016118973 A1 | 7/2016 | |
| WO | 2019145390 A1 | 8/2019 | |
| WO | 2020119301 A1 | 6/2020 | |

OTHER PUBLICATIONS

Directive 2001/83/EC of the European Parliament and of the Council of Nov. 6, 2001 on the Community code related to medicinal products for human use, Official Journal of the European Communities, (Year: 2001).
Directive 2011/62/EU of the European Parliament and of the Council of Jun. 8, 2011, amending Directive 2001/83/EC on the Community code relating to medicinal products for human use, as regards the prevention of the entry into the legal supply chain of falsified medicinal products, Official Journal of the European Union, (Year: 2011).
Etxeberria, E. et al., "Anatomical and Morphological Characteristics of Laser Etching Depressions for Fruit Labeling" HortTechnology, Technology Product Reports 16(3) (Year: 2006).
International Preliminary Report on Patentability from International Application No. PCT/EP2022/086139, issued Jun. 20, 2024.
International Preliminary Report on Patentability from International Application No. PCT/EP2022/086140, issued Jun. 20, 2024.
Khan, A. et al., "A survey of the recent architectures of deep convolutional neural networks" Artificial Intelligence Review, 53:5455-5516 (Year: 2020).
Sultana, F. et al., "Advancements in Image Classification using Convolutional Neural Network" Fourth International Conference on Research in Computational Intelligence and Communication Networks (2019).

* cited by examiner

READOUT OF OPTICALLY READABLE CODES

The present invention is concerned with the technical field of marking objects with optically readable codes and reading out the codes. Subjects of the present invention are a method, a system and a computer program product for capturing and interpreting optically readable codes introduced in surfaces of objects.

The tracking of goods and products plays an important part in many areas of the economy. Products and goods or their packagings and/or containers are provided with a unique identifier (e.g. a serial number) (serialization) in order to be able to track them along their supply chain and to capture incoming and outgoing products by machine.

In many cases, the identifier is applied in an optically readable form, e.g. in the form of a barcode (e.g. EAN-8 barcode) or a matrix code (e.g. QR code), on the products and goods or their packagings and/or containers (see e.g. EP3640901A1). The barcode or matrix code often conceals a serial number that usually provides information about the kind of product or good and about the origin.

In the case of some pharmaceutical products, an individual marking of individual packs is even required. Pursuant to Article 54a para. 1 of Directive 2001/83/EC amended by what is called EU Falsified Medicines Directive 2011/62/EU (FMD), at least medicinal products subject to prescription should be marked with an individual recognition feature (referred to as: Unique Identifier) which makes it possible in particular to check the authenticity and to identify individual packs.

Plant and animal products are usually only provided with a serial code. In the case of plant and animal products, a marking is usually applied or attached to a packaging and/or a container for example in the form of stickers or imprints.

In some cases, identifiers are also applied directly to plant or animal products. In the European Union, for example, eggs are provided with a producer code, from which the chicken husbandry, the country from which the egg originates, and the business from which the egg originates can be derived. The skin of fruit and vegetable units are increasingly also being provided with a marking (see e.g.: E. Etxeberria et al.: *Anatomical and Morphological Characteristics of Laser Etching Depressions for Fruit Labeling*, 2006, HortTechnology. 16, 10.21273/HORTTECH.16.3.0527).

Consumers are showing increasing interest in the origin and the supply chain of plant and animal products. They want to know for example from where the respective product originates, whether and how it was treated (e.g. with crop protection compositions), how long transport lasted, what conditions prevailed during transport and/or the like.

EP3896629A1 proposes providing plant and animal products with a unique identifier in the form of an optically readable code. The code can be read by a consumer for example by way of the camera of his/her smartphone. On the basis of the code read out, various items of information concerning the plant or animal product can be displayed to the consumer. EP3896629A1 proposes introducing the optically readable code into a surface of the plant or animal product by means of a laser, for example. An optical code introduced into the surface of a plant or animal product has a lower contrast with respect to the surrounding tissue and is thus more difficult to read out than for example an optical code applied with a black color on a white background, as is usually present in the case of stickers or tags. Furthermore, optical codes on different objects have a different appearance. If optically readable codes are applied to curved surfaces, for example, such as are present in the case of many fruits and types of vegetables, by means of a laser, a distortion of the codes can occur, and hampers readout. If optically readable codes are applied to smooth surfaces, reflections (e.g. as a result of ambient light) can occur on the surface during readout, and hamper readout. Surfaces of fruits and vegetables may be non-uniform; apples, for example, may have bitter pits and spots. Potatoes may have unevennesses. Such non-uniformities and unevennesses can hamper readout of codes.

The problem addressed is therefore that of providing means by which optically readable codes on a multiplicity of different objects, in particular on a multiplicity of plant and animal products, can be reliably read out by a consumer using simple means, such as a smartphone, for example.

This problem is solved by the subjects of the independent claims. Preferred embodiments are found in the dependent claims, the present description and the drawings.

A first subject of the present invention is a computer-implemented method for reading out an optically readable code introduced into a surface of an object, comprising the steps of receiving a first image recording of the object,
identifying the object on the basis of the first image recording,
reading out transformation parameters for the identified object from a database,
transforming the first image recording and/or a second image recording of the object on the basis of the transformation parameters, wherein a transformed image recording is obtained,
decoding the optically readable code imaged in the transformed image recording.

A further subject of the present invention is a system comprising at least one processor, wherein the processor is configured to receive a first image recording of an object, wherein the object comprises an optically readable code, wherein the optically readable code is introduced into a surface of the object,
to identify the object imaged in a first image recording,
to read out transformation parameters for the identified object from a database,
to transform the first image recording and/or a second image recording of the object in accordance with the transformation parameters, wherein a transformed image recording is obtained,
to decode the optically readable code imaged in the transformed image recording.

A further subject of the present invention is a computer program product comprising a data carrier on which a computer program is stored, wherein the computer program can be loaded into a main memory of a computer system, where it causes the computer system to execute the following steps:

receiving a first image recording of an object, wherein the object comprises an optically readable code, wherein the optically readable code is introduced into a surface of the object,
identifying the object on the basis of the first image recording,
reading out transformation parameters for the identified object from a database,
transforming the first image recording and/or a second image recording of the object on the basis of the transformation parameters, wherein a transformed image recording is obtained, decoding the optically readable code imaged in the transformed image recording.

The invention is explained in more detail below without distinguishing between the subjects of the invention (system, method, computer program product). The explanations that follow shall instead apply analogously to all subjects of the invention, regardless of the context (system, method, computer program product) in which they are provided.

Where steps are stated in an order in the present description or in the claims, this does not necessarily mean that the invention is limited to the order stated. Instead, it is conceivable that the steps are also executed in a different order or else in parallel with one another, the exception being when one step builds on another step, thereby making it imperative that the step building on the previous step be executed next (which will however become clear in the individual case). The orders stated are thus preferred embodiments of the invention.

The present invention provides means for reading out an optically readable code. The terms "reading out" and "decoding" are used synonymously in this description.

The term "optically readable code" is understood to mean markings that can be captured with the aid of a camera and be converted into alphanumeric characters, for example.

Examples of optically readable codes are barcodes, stacked codes, composite codes, matrix codes and 3D codes. Alphanumeric characters that can be captured (interpreted, read) and digitised by means of automated text recognition (referred to as optical character recognition, abbreviated to: OCR) also come under the term optically readable codes.

Optically readable codes belong to the machine-readable codes, i.e. to codes which can be captured and processed by means of a machine. In the case of optically readable codes, such a "machine" usually comprises a camera.

A camera usually comprises an image sensor and optical elements. The image sensor is a device for recording two-dimensional images from light by electrical means. This usually involves a semiconductor-based image sensor, for example a CCD (CCD=charge-coupled device) or CMOS sensor (CMOS=complementary metal oxide semiconductor). The optical elements (lenses, stops and the like) serve for maximum sharpness of imaging of the object of which a digital image recording is to be generated on the image sensor.

Optically readable codes have the advantage that they can be read out by many consumers using simple means. In this regard, many consumers have for example a smartphone equipped with one or more cameras. By means of such a camera, it is possible to generate an image representation of the optically readable code on the image sensor. The image representation can be digitized and processed and/or stored by a computer program stored on the smartphone. Such a computer program can be configured to identify and to interpret the optically readable code, i.e. to translate it into a different form such as, for example, into a number sequence, a sequence of letters and/or the like, depending on what information is present in the form of the optically readable code.

The optically readable code is introduced into a surface of an object. Such an object is a real, physical, tangible object. Such an object can be a natural object or an industrially produced object. Examples of objects within the meaning of the present invention are: tools, machine components, circuit boards, chips, containers, packagings, jewellery, design objects, art objects, medicaments (e.g. in the form of tablets), medicament packagings and also plant and animal products.

In one preferred embodiment of the present invention, the object is a medicament (e.g. in the form of a tablet or capsule) or a medicament packaging.

In a further preferred embodiment of the present invention, the object is an industrially produced product such as, a component for a machine.

In a further preferred embodiment of the present invention, the object is a plant or animal product.

A plant product is an individual plant or a part of the plant (e.g. a fruit) or a group of plants or a group of parts of a plant. An animal product is an animal or a part of an animal or a group of animals or a group of parts of an animal or an object which has been produced by an animal (such as e.g. a hen's egg). Industrially processed products such as, for example, cheese and sausage products are also intended to come under the term "plant or animal product".

The plant or animal product is usually a part of a plant or of an animal which is suitable and/or intended for consumption by a human being or an animal.

The plant product is preferably at least a part of a crop plant. The term "crop plant" is understood to mean a plant which is specifically grown as a useful plant by human intervention. In one preferred embodiment, the crop plant is a fruit plant or a vegetable plant. Even though fungi are not regarded biologically as plants, fungi, in particular the fruiting bodies of fungi, are also intended to come under the term plant product.

Preferably, the crop plant is one of the plants listed in the following encyclopaedia: Christopher Cumo: *Encyclopedia of Cultivated Plants: From Acacia to Zinnia*, Volumes 1 to 3, ABC-CLIO, 2013, ISBN 9781598847758.

A plant or animal product can be for example an apple, a pear, a lemon, an orange, a tangerine, a lime, a grapefruit, a kiwi, a banana, a peach, a plum, a mirabelle, an apricot, a tomato, a cabbage (a cauliflower, a white cabbage, a red cabbage, kale, Brussels sprouts or the like), a melon, a pumpkin, a cucumber, a pepper, a zucchini, an aubergine, a potato, a sweet potato, a leek, celery, a kohlrabi, a radish, a carrot, a parsnip, a scorzonera, asparagus, sugar beet, ginger root, rhubarb, a coconut, a Brazil nut, a walnut, a hazelnut, a sweet chestnut, an egg, a fish, a piece of meat, a piece of cheese, a sausage and/or the like.

The optically readable code is introduced into a surface of the object. That means that the optically readable code is not attached to the object in the form of a tag, nor is it applied to the object in the form of a sticker. Instead, a surface of the object was modified such that the surface itself carries the optically readable code.

In the case of plant products and eggs, the surface can be the skin/shell, for example.

The optically readable code can be engraved, etched, burned, impressed into the object and/or introduced into a surface of the object in some other way. Preferably, the optically readable code is introduced into the surface of the object (for example into the skin in the case of a fruit or vegetable) by means of a laser. In this case, the laser can modify (e.g. bleach or destroy) dye molecules in the surface of the object and/or lead locally to instances of combustion and/or destruction and/or chemical and/or physical modifications of the tissue (e.g. evaporation of water, denaturing of protein and/or the like), thus giving rise to a contrast with respect to the surrounding part (part not modified by the laser) of the surface.

The optically readable code can also be introduced into a surface of the object by means of a water jet or stream of sand.

The optically readable code can also be introduced into a surface of the object mechanically by scribing, pricking, parting, rasping, scraping, stamping and/or the like.

Details concerning the marking of objects, in particular plant or animal products, can be gathered from the prior art (see, for example, EP2281468A1, WO2015/117438A1, WO2015/117541A1, WO2016/118962A1, WO2016/118973A1, DE102005019008A, WO2007/130968A2, U.S. Pat. No. 5,660,747, EP1737306A2, U.S. Pat. No. 10,481,589, US20080124433).

Preferably, the optically readable code has been introduced into the surface of the object by a carbon dioxide laser ($CO_2$ laser).

Introducing an optically readable code into a surface of an object usually leads to a marking that has a lower contrast than, for example, an optically readable code in the form of a black or colored imprint on a white sticker. The contrast can be optimized by virtue of the possibility of individual design of the sticker; by way of example, a black marking (e.g. a black barcode or a black matrix code) on a white background has a very high contrast. Such high contrasts are not usually attained by means of introducing optically readable codes into a surface of an object, particularly in the case of plant or animal products and in the case of medicaments. This can lead to difficulties when reading out the codes. Moreover, optically readable codes introduced into a surface of an object by means of a laser have a different appearance for different objects. In other words: optically readable codes introduced into an apple, for example, usually have a different appearance from optically readable codes introduced into a banana, a tomato, a pumpkin or a potato. The respective variety of a fruit can also influence the appearance of the optically readable code: optically readable codes in an apple of the "Granny Smith" variety have a different appearance from optically readable codes in an apple of the "Pink Lady" variety. The structure of the surface of a plant or animal product can also influence the appearance of an optically readable code: the comparatively rough surface structure of the kiwi can hamper the readout of an optically readable code in just the same way as unevennesses and spots in the skin of potatoes and apples. The surfaces of fruits and vegetables usually have curvatures. If an optical code is introduced into a curved surface, a distortion of the code can occur; the code can have a pincushion or barrel distortion, for example. Such distortions can hamper the decoding of codes. The extent of a distortion is usually dependent on the degree of curvature in this case. If an optically readable code having a size of 2 cm×2 cm is introduced into an apple, the distortion is greater than if the same code is introduced into a melon. Moreover, the distortions that arise on approximately spherical products (e.g. apple, tomato, melon) are different from those on approximately cylindrical products (e.g. cucumbers). Smooth surfaces (as in the case of apples, for example) produce more reflections (e.g. as a result of ambient light) than rough surfaces (as in the case of a kiwi, for example).

According to the invention, therefore, image recordings of optically readable codes introduced into a surface of an object are subjected to one transformation or to a plurality of transformations before the codes are read out. Such a transformation can increase the contrast between the optically readable code and the surrounding part of the surface (the part of the surface which does not carry any code) and/or reduce or eliminate distortions and/or reduce or eliminate reflections and/or reduce or eliminate the artefacts attributable to the specific object present. In this case, the one or the plurality of transformations is/are selected specifically for the object respectively present.

A "transformation" is a function or an operator which receives an image as input and generates an image as output. The transformation can ensure that an optically readable code which is imaged in the input image has a higher contrast vis-à-vis its surroundings in the output image than in the input image and/or has less distortion in the output image than in the input image. The transformation can ensure that reflections of light on the surface of the object are reduced in the output image by comparison with the input image. The transformation can ensure that 45 unevennesses and/or non-uniformities on the surface of the object appear less distinctly in the output image than in the input image. Generally, the transformation ensures that the output image generates fewer decoding errors during the decoding of the imaged optically readable code than the input image. Such a decoding error arises, for example, if a white square of a QR code is interpreted as a black square by the image sensor.

One or more transformation parameters determine what transformation(s) is (are) carried out and, in the case of a plurality of transformations, in what order they are carried out.

Firstly, a first image recording of the object is generated.

The term "image recording" is preferably understood to mean a two-dimensional image representation of the object or of a part thereof. The image recording is usually a digital image recording. The term "digital" means that the image recording can be processed by a machine, generally a computer system. "Processing" is understood to mean the known methods for electronic data processing (EDP).

By means of computer systems and software, digital image recordings can be processed, edited and reproduced and also converted into standardized data formats such as, for example, JPEG, Portable Network Graphics (PNG) or Scalable Vector Graphics (SVG). Digital image recordings can be visualized by means of suitable display devices, such as computer monitors, projectors and/or printers, for example.

In a digital image recording, image contents are usually represented by whole numbers and stored. In most cases this involves two-dimensional images which can be binary coded and optionally compressed. The digital image recordings usually involve raster graphics, in which the image information is stored in a uniform raster grid. Raster graphics consist of a raster arrangement of so-called picture elements (pixels) in the case of two-dimensional representations or volume elements (voxels) in the case of three-dimensional representations, to which a color or a grayscale value is assigned in each case. The main features of a 2D raster graphic are therefore the image size (width and height measured in pixels, also informally called image resolution) and the color depth. A color is usually assigned to a pixel of a digital image file. The color coding used for a pixel is defined, inter alia, in terms of the color space and the color depth. The simplest case is a binary image, in which a pixel stores a black-and-white value. In the case of an image, the color of which is defined in terms of the so-called RGB color space (RGB stands for the primary colors red, green and blue), each pixel consists of three color values, one color value for the color red, one color value for the color green and one color value for the color blue. The color of a pixel arises from the superimposition (additive mixing) of the three color values. The individual color value is discretized e.g. into 256 distinguishable levels, which are called tonal values and usually range from 0 to 255. The color nuance "0" of each color channel is the darkest. If all three channels have the tonal value 0, the corresponding pixel appears black; if all three channels have the tonal value 255, the corresponding pixel appears white. When carrying out the present invention, digital image recordings are subjected to certain operations (transformations). In this case, the operations predominantly concern the pixels as so-called spatial operators such as an edge detector, for example, or the tonal values of the individual pixels as in the case of color space transformations, for example. There are a multiplicity of possible digital image formats and color codings. For simplification, it is assumed in this description that the present images are RGB raster graphics having a specific number of pixels. However, this assumption ought not in any way be understood as limiting. It is clear to a person skilled in the art of image processing how they can apply the teaching of this description to image files which are present in other image formats and/or in which the color values are coded differently.

The at least one image recording can also be one or more excerpts from a video sequence.

The at least one image recording is generated with the aid of one camera or a plurality of cameras. Preferably, the at least one image recording is generated by one or more cameras of a smartphone.

The use of a plurality of cameras which view an object from different directions and generate image recordings from different viewing directions has the advantage that depth information is captured. By way of example, information about curvatures of the imaged object that are present can be derived and/or gathered from such depth information.

The first image recording shows the optically readable code introduced into the surface of the object.

The first image recording serves for determining transformation parameters. On the basis of the first image recording, those transformation parameters are determined which, in the course of a transformation of the first image recording (and/or of a second image recording) in accordance with the transformation parameters, lead to a transformed image recording which generates fewer decoding errors during the decoding of the imaged optical code than the first image recording, e.g. by virtue of the fact that the contrast of the optically readable code vis-à-vis the surroundings of the optically readable code is higher in the case of the transformed image recording than in the case of the first image recording and/or fewer distortions/reflections occur.

The transformation parameters can be determined in two steps: in a first step, that object which is imaged (at least proportionally) in the first image recording can be identified; in a second step, those transformation parameters which, for the identified object, lead to an increase in the contrast of the optically readable code vis-à-vis its surroundings can be read out from a data storage medium.

The identification can be effected for example on the basis of characteristic properties of the object which are imaged in the first image recording. Such characteristic properties are for example the color and/or the color distribution, the shape, the size, the texture and/or other/further properties. Pattern recognition methods such as are known to those skilled in the art of image processing can be used to identify the object on the basis of imaged characteristic features.

Preferably, a trained machine learning model is used for the identification of the object. Such a model is also referred to as a recognition model in this description.

Such a model can be trained, in a supervised learning method, to output at least proportionally on the basis of the first image recording information indicating what object there is in the first image recording.

A "machine learning model" can be understood as a computer-implemented data processing architecture. The model can receive input data and supply output data on the basis of said input data and model parameters. The model can learn a relationship between the input data and the output data by means of training. During training, the model parameters can be adapted to supply a desired output for a specific input.

During the training of such a model, the model is presented with training data from which it can learn. The trained machine learning model is the result of the training process. Besides input data, the training data include the correct output data (target data) that are to be generated by the model on the basis of the input data. During training, patterns that map the input data onto the target data are recognized.

In the training process, the input data of the training data are input into the model, and the model generates output data. The output data are compared with the target data (so-called ground truth data). Model parameters are altered so as to reduce the deviations between the output data and the target data to a (defined) minimum.

During training, a loss function can be used to assess the prediction quality of the model. The loss function can be chosen such that it rewards a desired relationship between output data and target data and/or punishes an undesired relationship between output data and target data. Such a relationship can be e.g. a similarity, a dissimilarity or some other relationship.

A loss function can be used to calculate a loss for a given pair comprising output data and target data. The aim of the training process can consist in altering (adapting) the parameters of the machine learning model so that the loss value for all pairs of the training data set is reduced to a (defined) minimum.

A loss function can quantify e.g. the deviation between the output data of the model for specific input data and the target data. For example, if the output data and the target data are numbers, the loss function can be the absolute difference between these numbers. In this case, a high absolute value of the loss function can mean that one or more model parameters must be changed to a great extent.

In the case of output data in the form of vectors, for example, difference metrics between vectors such as the mean square error, a cosine distance, a norm of the difference vector such as a Euclidean distance, a Chebyshev distance, an Lp norm of a difference vector, a weighted norm or any other type of difference metric of two vectors can be chosen as the loss function.

The machine learning model can be embodied (configured) as a classification model which assigns an image recording as input data to a specific object as output data. The model can output for example a number representing the specific object imaged in the image recording.

Such classification models are described in the prior art (see e.g. F. Sultana et al.: *Advancements in Image Classification using Convolutional Neural Network*, arXiv: 1905.03288v1 [cs.CV], 2019; A. Khan et al.: *A Survey of the Recent Architectures of Deep Convolutional Neural Networks*, Artificial Intelligence Review, DOI: https://doi.org/10.1007/s10462-020-09825-6).

In this description, the assignment of the first image recording to that object which is imaged in the first image recording is also referred to as "identifying the object". In this case, the first image recording can be assigned to that object and/or to that respective part of an object which is imaged in the image recording. In the case of plant products, the first image recording can also be assigned to a degree of ripeness and/or to a visual appearance; in the case of bananas, for example, to a green or yellow banana; in the case of pepper, for example, to a green, yellow or red pepper; in the case of an apple, to the apple variety respectively present, and/or the like.

Ultimately, identifying the object in the first image recording serves for determining transformation parameters which are intended to be applied to the first image recording (or a second image recording), e.g. in order to increase the contrast of the optically readable code vis-à-vis its surroundings, to reduce distortions, to reduce reflections and/or to reduce/eliminate other characteristic features which may lead to decoding errors. The identification is thus intended to identify characteristics of the imaged object which allow the selection of those transformation parameters which result in the optically readable code being decoded with the fewest possible errors.

Transformation parameters are usually stored in a data storage medium, for example in a relational database. The machine learning model can be configured and trained to output on the basis of the first image recording an identifier linked with the transformation parameters in the database. In other words: on the basis of an identifier representing the object imaged in the first image recording, transformation parameters assigned to the identifier can be determined and read out from a database.

It is also conceivable for the machine learning model to be trained to supply/output the transformation parameters itself.

As already described, the transformation parameters define what transformation(s) is (are) intended to be applied to the first image recording (or to a second image recording) and, in the case of a plurality of transformations, in what order the transformations are intended to be applied.

Those transformations which, for a specific object, ensure that the transformed image recording generates fewer decoding errors than the non-transformed image recording can be determined empirically.

For a multiplicity of objects, it is thus possible to generate image recordings in which optically readable codes introduced into a surface of the objects are imaged at least proportionally. A person skilled in the art of image processing can stipulate for the individual recordings transformations which lead to an increase in the contrast of the optically readable code with respect to the surroundings thereof and/or which led to a reduction/elimination of distortions and/or which reduce/eliminate reflections and/or reduce/eliminate the other characteristic features that can lead to decoding errors.

The decoding error can be determined empirically. A decoding error can be for example the percentage proportion of codes that could not be decoded. Many optically readable codes have means for error correction. The decoding error can also signify the number of corrected bits in a code.

Each of the transformations can be tested; if they do not result in the desired success, they can be discarded, refined, changed and/or extended by further transformations.

Examples of transformations are: spatial low-pass filtering, spatial high-pass filtering, sharpening, blur (e.g. Gaussian blur), unsharp masking, erosion, median filter, maximum filter, reduction of contrast range, edge detection, reduction of color depth, greyscale level conversion, negative creation, color corrections (color balance, gamma correction, saturation), color replacement, Fourier transformation, Fourier low-pass filter, Fourier high-pass filter, inverse Fourier transformation.

Some transformations can be carried out by convolution of the raster graphics using one or more convolution matrices (referred to as: convolution kernel). The latter are usually square matrices having odd dimensions, which can have various sizes (for example 3×3, 5×5, 9×9 and/or the like). Some transformations can be represented as a linear system, wherein a discrete convolution, a linear operation, is applied. For discrete two-dimensional functions (digital images), the following calculation formula arises for the discrete convolution:

$$I^*(x, y) = \sum_{i=1}^{n} \sum_{j=1}^{n} I(x - i + a, y - 1 + a)(k(i, j)$$

where $I^*(x,y)$ represents the result pixels of the transformed image recording and $I$ is the original image recording to which the transformation is applied. $a$ indicates the coordinate of the center point in the square convolution matrix and $k(i,j)$ is an element of the convolution matrix. In the case of 3×3 convolution matrices, $n=3$ and $a=2$; in the case of 5×5 matrices, $n=5$ and $a=3$.

Transformations and sequences of transformations are listed below which, in the case of apples, for example, have the effect that the transformed image recording generates fewer decoding errors than the non-transformed image recording:

color transformation into intensity-linear RGB signals color transformation of the linear RGB signals into e.g. a reflection channel and/or an illumination channel and at least two color channels for differentiating the coded and uncoded surface parts. For this purpose, the intensity-linear RGB color signals are linearly combined among one another so as to effect the best possible differentiation between coded and uncoded surface parts.

Reflection correction by subtracting the reflection channel from the at least two color channels (additive correction)

illumination correction by normalising the at least two color channels to the illumination channel (multiplicative correction)

correction of disturbances in the apple surface by detection of the disturbances and spatial interpolation from the surroundings of the imperfection unsharp masking of the illumination- and reflexion-corrected image segments using a filter mask in terms of an extent, with the result that spatial inhomogeneities e.g. of the image brightness are well compensated for by the curved surface shape of the apple, and the image contrast between coded and uncoded surface parts is amplified and optimized by increasing the high-frequency image portions.

Further examples of transformations can be gathered from the numerous publications on the topic of digital image processing.

It is furthermore conceivable to analyze the first image recording in order to directly derive transformation parameters from the image recording. In the case of the identification of the object imaged in the image recording, transformation parameters are determined on the basis of the identified object; in the case of the direct derivation of transformation parameters, the latter can be derived from the manner in which the object is imaged. By way of example, it is possible to determine an average brightness, a contrast range, a color distribution, and/or the like, on the basis of which one or more transformation parameters which lead to fewer decoding errors are selected or set or determined. An optimization of contrast between coded and uncoded surface regions can alternatively also be achieved directly by a correlation analysis, e.g. by a principal axis transformation of the recorded object colors in this image region.

In a further step, one or more transformations are applied to the first image recording or to a second image recording in accordance with the transformation parameters. As already made clear, the transformations do not have to be applied to the first image recording, i.e. that image recording on the basis of which the transformation parameters have been determined. Instead, it is also conceivable to apply the transformations to a second image recording, which preferably shows the same object as the first image recording but optionally at a different point in time (e.g. earlier or later). It is conceivable for the camera used to generate the first image recording to be configured, continuously at a defined rate, to digitize image representations incident on the image sensor of the camera, to generate digital image recordings, and to feed these digital image recordings to a recognition model for recognizing the imaged object. The recognition model can communicate an identifier for the recognized (identified) object to a control unit, which determines transformation parameters on the basis of the identifier. The transformation parameters determined can then be applied to one or more of the subsequently generated digital image recordings. Such a subsequently generated image recording is referred to as a "second image recording" in this description.

It is likewise conceivable for the imaged object not to be identified on the basis of a single first image recording, but rather on the basis of a plurality of first image recordings, e.g. on the basis of a series of temporally successive image recordings. It is likewise conceivable for transformation parameters not to be determined on the basis of a single first image recording, but rather on the basis of a plurality of first image recordings, e.g. on the basis of a series of temporally successive image recordings. It is likewise conceivable for the transformations not to be applied to a single (first or second) image recording, but rather to a plurality of image recordings, for example to image recordings of a series of temporally successive image recordings.

The result of one or more transformations being applied to an image recording of the optically readable code in a surface of an object is a transformed image recording.

In the transformed image recording, the optically readable code is able to be recognized and read out better than in the original (non-transformed) image recording.

In a next step, the code in the transformed image recording is read out (decoded). Depending on the code used, here there are already existing methods for reading out (decoding) the respective code.

The code read out (decoded) can contain information concerning the object in whose surface the code is introduced.

In one preferred embodiment, the code read out comprises a (unique) identifier, on the basis of which a consumer can acquire further information concerning the object for example from a database. The code read out and/or information linked with the code read out can be output, i.e. displayed on a screen, printed out on a printer and or stored in a data storage medium.

Further information concerning such a (unique) identifier and the information which can be stored with respect to the object linked with the identifier and can be displayed to a consumer is described in the patent application EP3896629A1, the content of which shall be fully incorporated by reference in this description.

The invention is explained in more detail below with reference to drawings, without wishing to restrict the invention to the features and combinations of features that are shown in the drawings.

FIG. 1 shows schematically and by way of example in the form of a flowchart the readout of an optically readable code introduced into a surface of an object.

In a first step (110), a digital image recording (I) of the object (O) is generated with the aid of a camera (C). In a second step (120), the digital image recording (I) is fed to a recognition model (IM). The recognition model (IM) is configured to identify the object (O) imaged in the image recording (I) on the basis of the image recording (I). In a third step (130), the recognition model (IM) supplies information (OI1) about the identified object (O). In a 4 step (140), transformation parameters (TP) are determined from a database (DB) on the basis of the information (OI1) about the identified object (O). In a fifth step (150), the determined transformation parameters (TP) are fed to a process for transforming the image recording (I). In a sixth step (160), one or more transformations are applied to the image recording (I) in accordance with the transformation parameters (TP). The result is a transformed image recording (I*), in which an optically readable code (in this case a QR code) introduced into a surface of the object (O) has a higher contrast vis-à-vis its surroundings and is thus more clearly recognizable and easier to read out than the code in the case of the non-transformed image recording (i). In a seventh step (170), the optically readable code is read out and the code (OI2) read out is provided. The code (OI2) read out can be displayed and/or information concerning the object O, on the basis of the code OI read out, can e.g. be read out from a database and provided (e.g. communicated and displayed).

Figure 2:
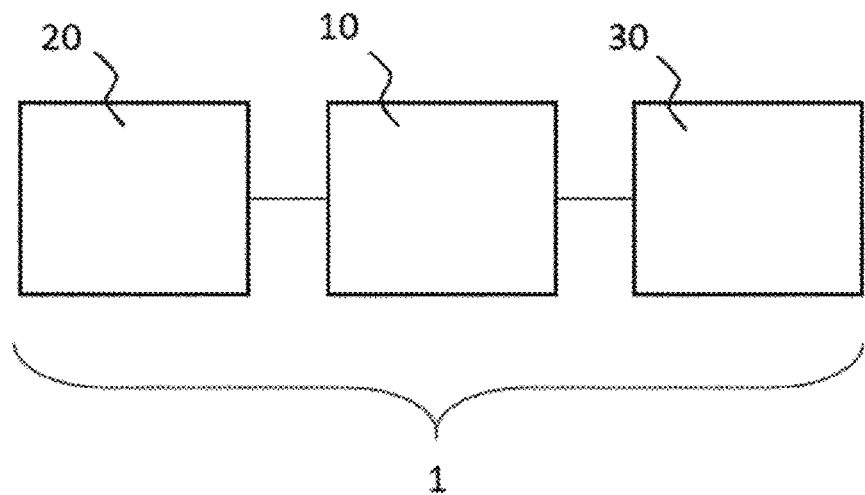

FIG. 2 shows by way of example and schematically a system according to the invention.

The system (1) comprises a computer system (10), a camera (20) and one or more data storage media (30). Image recordings of objects can be generated with the aid of the camera (20). The camera (20) is connected to the computer system (10), such that the image recordings generated can be transmitted to the computer system (10). The camera (20) can be connected to the computer system (10) via a cable connection and/or via a radio connection. A connection via one or more networks is also conceivable. It is furthermore conceivable for the camera (20) to be an integral part of the computer system (10), as is the case for example for present-day smartphones and tablet computers.

The computer system (10) is configured (for example by means of a computer program) to receive an image recording (from the camera or from a data storage medium), to identify the object imaged in the image recording, to determine transformation parameters on the basis of the identified object, to transform the image recording and/or a further image recording of the object in accordance with the transformation parameters, a transformed image recording being obtained, to decode the optical code in the transformed image recording and to output the decoded code and/or to provide information linked with the decoded code.

Image recordings, models, transformation parameters, transformation operators and/or transformation functions, recognition models, computer programs and/or other/further information can be stored in the data storage medium (30). The data storage medium (30) can be connected to the computer system (10) via a cable connection and/or via a radio connection. A connection via one or more networks is also conceivable. It is furthermore conceivable for the data storage medium (30) to be an integral part of the computer system 10. It is furthermore conceivable for a plurality of data storage media to be present.

Figure 3:
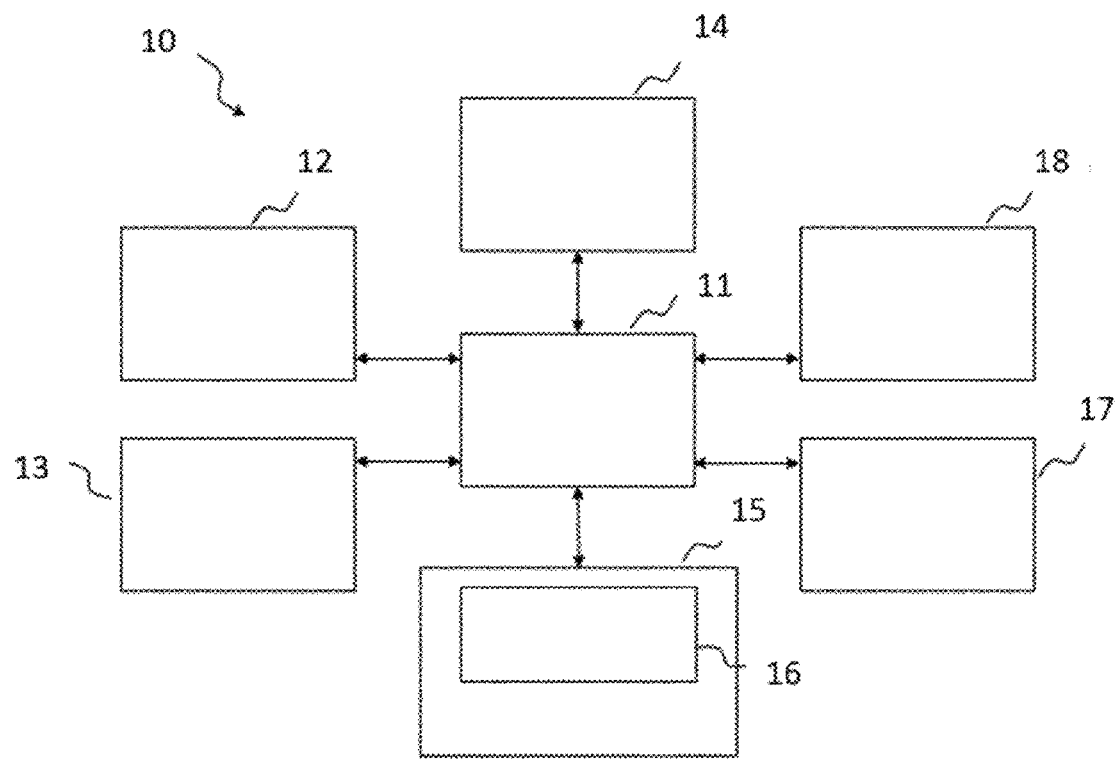

FIG. 3 schematically shows a computer system (10). Such a computer system (10) can comprise one or more stationary or portable electronic devices. The computer system (10) can comprise one or more components, such as e.g. a processing unit (11) connected to a storage medium (15).

The processing unit (11) can comprise one or more processors alone or in combination with one or more storage media. The processing unit (11) can be customary computer hardware that is able to process information such as e.g. digital image recordings, computer programs and/or other digital information. The processing unit (11) normally consists of an arrangement of electronic circuits, some of which can be designed as an integrated circuit or as a plurality of integrated circuits connected to one another (an integrated circuit is sometimes also referred to as a "chip"). The processing unit (11) can be configured to execute computer programs that can be stored in a main memory of the processing unit (11) or in the storage medium (15) of the same or a different computer system.

The storage medium (15) can be customary computer hardware that is able to store information such as e.g. digital image recordings, data, computer programs and/or other digital information either temporarily and/or permanently. The storage medium (15) can comprise a volatile and/or nonvolatile storage medium and can be fixedly built in or removable. Examples of suitable storage media are RAM (random access memory), ROM (read-only memory), a hard disk, a flash memory, an exchangeable computer floppy disk, an optical disk, a magnetic tape or a combination of the aforementioned. Optical disks can include compact disks with read-only memory (CD-ROM), compact disks with read/write function (CD-R/W), DVDs, Blu-ray disks and the like.

The processing unit (11) can be connected not just to the storage medium (15), but also to one or more interfaces (12, 13, 14, 17, 18) in order to display, transmit and/or receive information. The interfaces can comprise one or more communication interfaces (17, 18) and/or one or more user interfaces (12, 13, 14). The one or more communication interfaces can be configured such that they transmit and/or receive information, e.g. to and/or from a camera, other computers, networks, data storage media or the like. The one or more communication interfaces can be configured to transmit and/or receive information via physical (wired) and/or wireless communication connections. The one or more communication interfaces can comprise one or more interfaces for connection to a network, for example using technologies such as mobile phone, Wi-Fi, satellite, cable, DSL, optical fiber and/or the like. In some examples, the one or more communication interfaces can comprise one or more close-range communication interfaces configured to connect devices with close-range communication technologies such as NFC, RFID, Bluetooth, Bluetooth LE, ZigBee, infrared (e.g. IrDA) or the like.

The user interfaces (12, 13, 14) can comprise a display (14). A display (14) can be configured to display information to a user. Suitable examples thereof are a liquid crystal display (LCD), a light-emitting diode display (LED), a plasma display panel (PDP) or the like. The user input interface(s) (12, 13) can be wired or wireless and can be configured to receive information from a user in the computer system (10), for example for processing, storage and/or display. Suitable examples of user input interfaces are a microphone, an image or video recording device (for example a camera), a keyboard or a keypad, a joystick, a touch-sensitive surface (separate from a touchscreen or integrated therein) or the like. In some examples, the user interfaces can contain an automatic identification and data capture technology (AIDC) for machine-readable information. This can include barcodes, radiofrequency identification (RFID), magnetic strips, optical character recognition (OCR), integrated circuit cards (ICC) and the like. The user interfaces can furthermore comprise one or more interfaces for communication with peripherals such as printers and the like.

One or more computer programs (16) can be stored in the storage medium (15) and executed by the processing unit (11), which is thereby programmed to fulfill the functions described in this description. The retrieving, loading and execution of instructions of the computer program (16) can take place sequentially, such that an instruction is respectively retrieved, loaded and executed. However, the retrieving, loading and/or execution can also take place in parallel.

The system according to the invention can be embodied as a laptop, notebook, netbook, tablet PC and/or handheld device (e.g. smartphone). Preferably, the system according to the invention comprises a camera.

The invention claimed is:

1. A computer-implemented method comprising:
receiving a first image of an object, the object comprising an optically readable code, the optically readable code being incorporated into a surface of the object;
identifying the object based on the first image;
retrieving transformation parameters for the identified object from a database;
transforming the first image and/or a second image of the object based on the basis of the transformation parameters, with a transformed image being obtained; and
decoding the optically readable code depicted in the transformed image.

2. The method according to claim 1, wherein the object is a plant product or animal product.

3. The method according to claim 2, wherein the object is a vegetable product, wherein the optically readable code is incorporated into an exterior of the vegetable product.

4. The method of claim 1, wherein the object is a drug.

5. The method according to claim 1, wherein the optically readable code has been introduced into the surface of the object by means of a laser.

6. The method according to claim 1, wherein the optically readable code is a bar code or a matrix code.

7. The method according to claim 1, wherein the optically readable code is alphanumeric characters.

8. The method according to claim 1, wherein the object is identified based on characteristic features that are imaged in the first image.

9. The method according to claim 1, wherein the identifying the object based on the first image is carried out using a trained machine learning model, the machine learning model having been trained based on training data to assign an image to an object, the training data for each object of a plurality of objects comprises:
   i) at least one image of the object; and
   ii) information as to which object is imaged in the image.

10. The method of claim 9, wherein training the machine learning model comprises:
- inputting the at least one image of the object into the machine learning model;
- receiving output data from the machine learning model;
- calculating a deviation between the output data and the information about which object is depicted in the at least one image using an error function;
- modifying parameters of the machine learning model with a view to reducing the deviation; and
- storing the trained machine learning model in a data store.

11. The method according to claim 1, wherein the transformation parameters were determined empirically, with the empirical determination being selected from those transformation parameters in which the reading of an optically readable code in a transformed image leads to fewer decoding errors than the reading of the optical readable codes in a non-transformed image.

12. The method according to claim 1, wherein the transformation of the first image and/or the second image comprises one or more of the following steps:
- reducing distortions and/or contortions of the optically readable code depicted in the first and/or second image;
- reducing reflections in the first and/or second image; and
- increasing the contrast of the optically readable code depicted in the first and/or second image in relation to the area surrounding the optically readable code.

13. A system comprising at least one processor, wherein the processor is configured to;
- receive a first image of an object, the object comprising an optically readable code, the optically readable code being incorporated into a surface of the object;
- identify the object in the first image;
- read transformation parameters for the identified object from a database;
- transform the first image and/or a second image of the object according to the transformation parameters, with a transformed image being obtained; and
- decode the optically readable code imaged in the transformed image.

14. A computer program product comprising a data medium on which a computer program is stored, wherein the computer program can be loaded into a main memory of a computer system and causes the computer system to perform the following steps:
- receiving a first image of an object, the object comprising an optically readable code, the optically readable code being incorporated into a surface of the object;
- identifying the object based on the first image;
- retrieving transformation parameters for the identified object from a database;
- transforming the first image and/or a second image of the object based on the basis of the transformation parameters, with a transformed image being obtained; and
- decoding the optically readable code depicted in the transformed image.

* * * * *